United States Patent [19]

Spurr et al.

[11] 4,025,749
[45] May 24, 1977

[54] APPARATUS FOR MAKING BUTT-WELDED TUBES

[75] Inventors: Eugene V. Spurr, Wallingford; Edward S. Kedzior, Northford, both of Conn.

[73] Assignee: Allegheny Ludlum Industries, Inc., Pittsburgh, Pa.

[22] Filed: Mar. 25, 1976

[21] Appl. No.: 670,287

[52] U.S. Cl. .................................. 219/84; 29/125; 219/59; 219/119; 228/17.5
[51] Int. Cl.² ........................................ B23K 11/06
[58] Field of Search ............... 219/59, 84, 81, 8.5, 219/64, 65, 66, 119, 120; 29/125; 228/17.5, 147, 151; 72/52

[56] References Cited
UNITED STATES PATENTS

| | | | |
|---|---|---|---|
| 1,585,596 | 4/1926 | Smith | 29/125 |
| 1,884,465 | 10/1932 | Windsor | 219/59 |
| 3,154,037 | 10/1964 | Marath | 72/52 X |
| 3,596,453 | 4/1953 | Weidel | 219/66 |

*Primary Examiner*—E. A. Goldberg
*Attorney, Agent, or Firm*—Vincent G. Gioia; Robert F. Dropkin

[57] ABSTRACT

Apparatus for making butt-welded tube from a strip includes a pair of grooved weld rolls for aligning the longitudinal edges of the strip bent into a tubular shape. To insure that the inside seam of the tube is flush regardless of variations in thickness between strip edges, each roll is made in two sections. In a horizontal mill the seam is on top and each bottom roll section is fixed in horizontal position while the top roll section has limited axial movement. Resilient means bias the roll sections apart and against a top stop so that the top of one edge of the strip is higher than the other when the edges are of different thicknesses. If desired, the rolls may also be adjusted to insure that the outside seam of the tube is flush.

11 Claims, 2 Drawing Figures

APPARATUS FOR MAKING BUTT-WELDED TUBES

This invention relates to apparatus for making butt-welded tubes utilizing welding rolls and more particularly to making such tubes with a substantially smooth inner seam. It is common practice to make butt-welded tubes from rolled strip or skelp particularly steel and stainless steel strip. The strip is bent in a horizontal mill into tubular shape and then with its longitudinal edges close together the strip is passed through grooved welding rolls mounted on vertical axes. Mills of this general type are shown in the patent to Morris U.S. Pat. No. 3,691,337 dated Sept. 12, 1972, but the invention may be used with any tube welding rolls.

One problem involved in this type of mill is to have proper alignment of the strip edges during welding. The problem is magnified by the fact that rolled strip is seldom of the same thickness across its entire width. Thus it is common for one edge of the strip to be thicker than the other edge.

Prior to our invention it was common practice to remove the one-piece weld rolls from the weld roll block and add shims as required so that when the weld rolls were installed the tube edges aligned properly. This procedure is time consuming and requires a certain amount of guess work to determine the exact amount of shimming needed. When dimensional changes in skelp thickness occur the weld rolls have to be shimmed to align the skelp edges. Since the internal seam edges were offset, the aligned edges were aligned by gaging the OD of the tubing to be flush and allowing the edge dimension variance to be internal. As a result the internal scarfing tool tended to be unstable and not operate properly so that many tubes were rejected. In many cases, the formed tube shape leaving the last fin pass was not the shape of the weld rolls.

It is therefore an object of our invention to provide welding rolls which will confine the bent strip in such a manner that either the internal seam or external seam edges are not offset.

Another object is to provide such apparatus in which the rolls may be adjusted without removal.

These and other objects and features of the invention will become apparent from the following detailed description taken in connection with the accompanying drawings in which.

Figure 2:
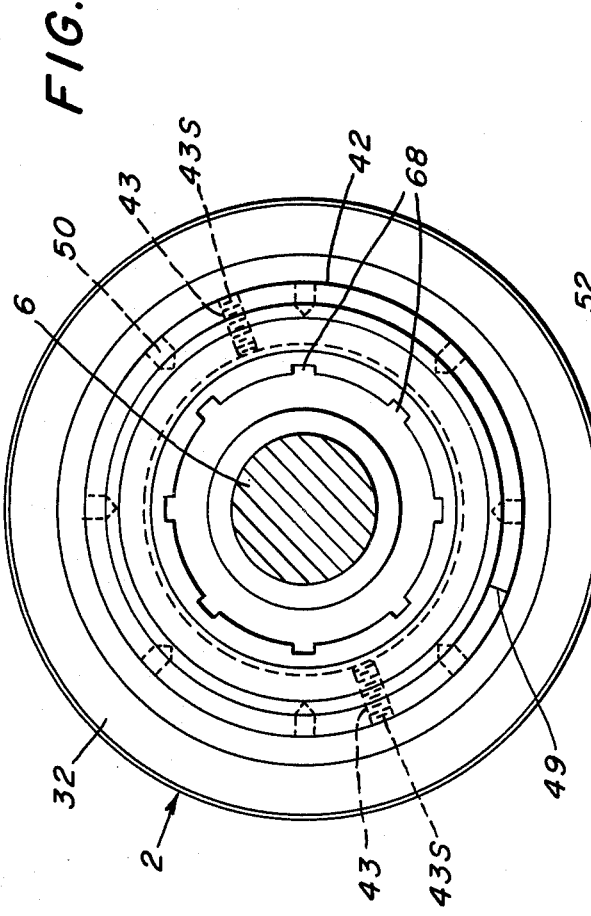
FIG. 2 is a top plan view of one roll.

Referring more particularly to the drawings reference numerals 2 and 4 indicate a pair of weld rolls for receiving a bent strip or skelp S. Since the rolls are substantially the same only roll 2 will be described in detail. The roll 2 includes a vertical stationary shaft or spindle 6 mounted in base 8. Surrounding the shaft 6 are antifriction bearings 10, each having an inner race 12 and outer race 14 with rollers 16 therebetween. A sleeve 18 surrounding the bearings 10 has an inner flange 20 extending into the space between bearings 10 and a lower flange 22 extending outwardly. A ring 24 surrounding the shaft 6 at its upper end holds the bearings 10 in place. Oil seals 26 above and below bearings 10 provide a sealed oil chamber 28 for the bearings. The roll proper is divided into lower section 30 and upper section 32. The lower section 30 is fastened to sleeve 18 by means of cap screws 34 passing through flange 22 into threaed holes 36 in role section 30 so that roll section is fixed with respect to sleeve 18. The upper section 32 is secured to sleeve 18 by a key 38. Keyway 40 in roll section 32 is longer than key 38 so that roll section 32 can move axially while rotating with shaft 6. A pressure nut 42 is threaded on upper threaded portion 44 of sleeve 18 with its bottom abutting the top of roll section 32. In one roll the threads will be right hand and in the other, left hand. A pair of tapped holes 43 are provided through the wall of nut 42 for receiving set screws 43S. A tube 46 is received in a groove in nut 42 and is provided with scale markings 48 to indicate the vertical position of the nut. The scale markings 48 are preferably graduated in thousands of an inch and a scribe line 49 is made on roll section 32. Holes 50 are provided in nut 46 for ease of rotation by means of a tool. When assembled the scribe line 49 indicates the zero position when the wall thickness is uniform. A seal 52 is provided at the top of nut 46. A substantially semi-circular peripheral groove 54 is provided in the outer surface of the assembled roll sections with substantially equal portions in each section. Roll sections 30 and 32 have opposed peripheral grooves 56 and 58, respectively, in their inner surface for receiving compression springs 60. Upper and lower shoulders are provided by the grooves against which the springs bear. If desired, an upper ring 62 may be provided in groove 58 in lower retaining ring 64 having upwardly extending pins 66, one for each spring may be provided in groove 56. In one particular embodiment 24 springs are provided in each roll. Tool receiving slots 68 are preferably made in sleeve 18.

Figure 1:
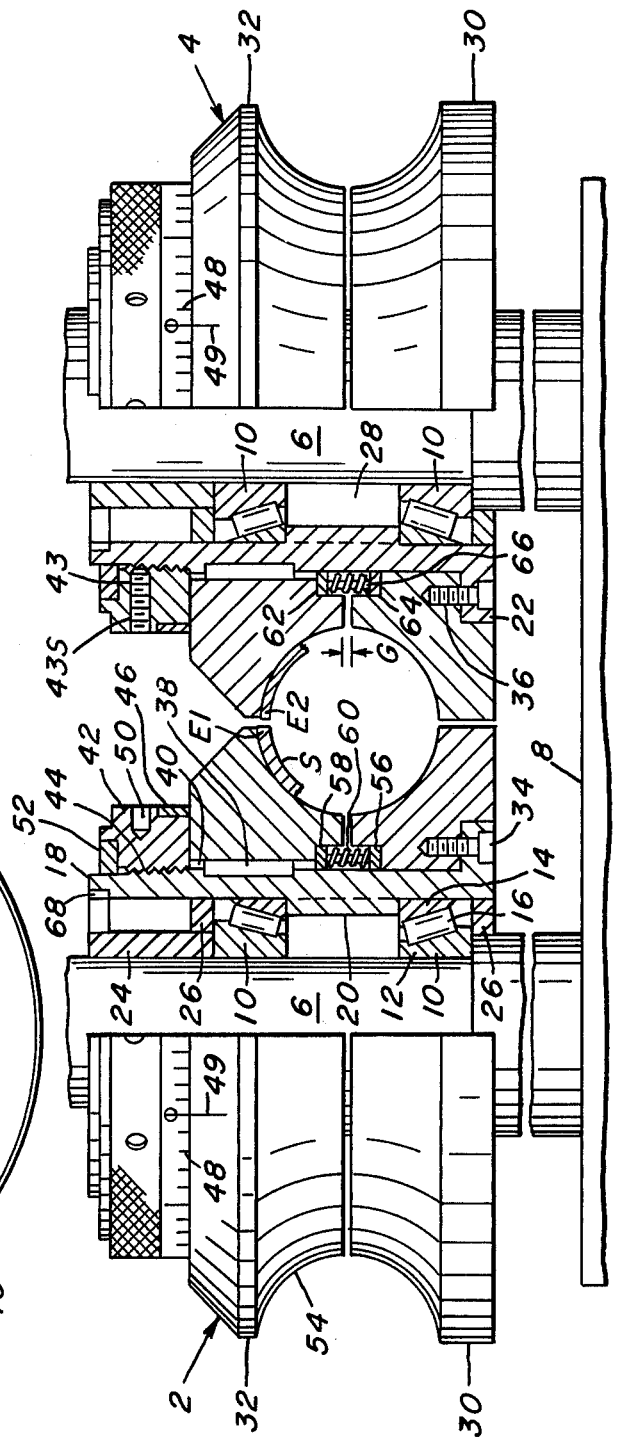
FIG. 1 is an elevation, partly in section, of the rolls of our invention.

In operation, the pressure nut 42 is rotated to position it in the desired location. This is done by inserting a tool into one of the slots 68 to prevent sleeve 18 from turning and turning the nut 42 by a spanner wrench inserted into one of its holes 50. Set screws 43S are then screwed into holes 43 and against sleeve 18 to hold the nut 42 in the desired position. The upper roll section 32 is biased upwardly by springs 60 against the nut 42 with back lash being negligent. Gap G between the roll sections in one particular embodiment may vary between 0 and 0.030 inches. With the strip edge thickness being equal each roll is adjusted to the same zero position. If edge E1 is thicker than edge E2 as shown in FIG. 1, the pressure nut of roll 4 is adjusted downwardly until the bottom of the edges are in alignment. It will be seen that if edge E2 is thicker than edge E1 the upper section of roll 2 will be lowered.

It will be seen that the rolls may be adjusted in the opposite direction if it is desired to align the top of the edges rather than the bottom.

Instead of both rolls being split, only one may be split and adjustable, but this limits the amount of control.

While one embodiment has been shown and described, it will be readily apparent to those skilled in the art that various adaptations and modifications may be made within the scope of the invention.

We claim:

1. Apparatus for confining an elongated strip bent into tubular shape with its longitudinal edge separated to form a slot therebetween comprising a pair or rolls each having a peripheral groove therein for receiving substantially half of said bent strip with its slot adjacent the outer pheriphery of said groove; at least one of said rolls including a shaft, a pair of roll sections each including a portion of said peripheral groove mounted on said shaft, resilient means biasing said roll sections axially apart, and means limiting the amount of said movement of said roll sections.

2. Apparatus according to claim 1 including means securing the roll section remote from said slot on said shaft in fixed axial position, and means mounting the other of said roll sections on said shaft for limited axial movement.

3. Apparatus according to claim 1 including bearing means mounted on said shaft, a rotatable sleeve surrounding said bearings, means securing the roll section remote from said slot in fixed position on said sleeve means mounting the other of said roll sections on said sleeve for rotation therewith and limited axial movement with respect thereto, an external threaded portion on the end of said sleeve beyond said other of said roll sections, and a nut threaded on said threaded portion and bearing against said other of said roll section to limit axial movement thereof.

4. Apparatus according to claim 3 in which said resilient means biasing said roll sections apart includes an internal peripheral groove in each roll section facing the internal peripheral groove of the other roll section and each providing a shoulder, and a plurality of spaced apart springs in said internal peripheral groove bearing against said shoulders.

5. Apparatus according to claim 4 in which both of said pair of rolls are adjustable.

6. Apparatus according to claim 5 in which said pair of rolls are weld rolls for welding the longitudinal edges of said strip together to form a tube.

7. Apparatus according to claim 6 in which the shafts of said rolls are vertical.

8. Apparatus according to claim 1 in which both of said pair of rolls are adjustable.

9. Apparatus according to claim 2 in which both of said pair of rolls are adjustable.

10. Apparatus according to claim 3 in which both of said pair of rolls are adjustable.

11. Apparatus according to claim 10 in which said pair of rolls are weld rolls for welding the longitudinal edges of said strip together to form a tube.

* * * * *